United States Patent
Vassiliadis et al.

[15] 3,703,176
[45] Nov. 21, 1972

[54] SLIT LAMP PHOTOCOAGULATOR

[72] Inventors: Arthur Vassiliadis, Los Altos; Harold C. Zweng, Woodside; Norman A. Peppers, Belmont; Lloyd E. Alterton, Sunnyvale, all of Calif.

[73] Assignees: Stanford Research Institute, Menlo Park; Stanford University, Stanford, Calif. ; part interest to each

[22] Filed: May 28, 1970

[21] Appl. No.: 41,505

[52] U.S. Cl. ............. 128/395, 128/303.1, 331/94.5, 351/14
[51] Int. Cl. .............................................. A61n 5/01
[58] Field of Search ...................... 128/394–398, 362, 128/303.1; 351/14; 331/94.5

[56] References Cited

UNITED STATES PATENTS

| 3,467,099 | 9/1969 | Lotmar .................. 128/303.1 |
| 3,481,340 | 12/1969 | McKnight et al. ......... 128/395 |
| 3,528,424 | 9/1970 | Ayres .................... 128/303.1 |
| 3,096,767 | 7/1963 | Gresser et al. ............. 128/395 |
| 3,084,694 | 4/1963 | Kavanagh et al. ......... 128/396 |
| 3,348,547 | 10/1967 | Kavanagh ................. 128/395 |
| 3,487,835 | 1/1970 | Koester et al. ........... 128/303.1 |
| 3,535,027 | 10/1970 | Littmann et al. ............ 351/14 |

FOREIGN PATENTS OR APPLICATIONS

| 727,217 | 2/1966 | Canada .................... 128/395 |
| 1,526,979 | 4/1968 | France .................... 128/395 |
| 245,278 | 11/1969 | U.S.S.R. .................. 128/395 |

OTHER PUBLICATIONS

L'Esperance, F. A., Trans. of the American Opthalmological Society, 1968, pp. 839–845.
Malt, R. A., Technology Review, Vol. 66, No. 6, Apr. 1964, pp. 25–26.

Primary Examiner—Kyle L. Howell
Attorney—Flehr, Hohbach, Test, Albritton & Herbert

[57] ABSTRACT

A combination slit lamp and laser photocoagulator for treating eye disorders in which the laser is coupled to the slit lamp through an articulated arm. The slit lamp optics are arranged such that the laser beam is always in focus at the focus of the slit lamp and one lens in the laser optics is movable so as to vary the point on the eye where the laser impinges. A shutter blocks most of the laser output but permits a small amount to pass for alignment purposes. Means are provided to vary the power of the laser beam which is applied to the eye and indicating means are provided to indicate the amount of power. Means are also provided for varying the spot size of the laser where it impinges upon the eye.

8 Claims, 7 Drawing Figures

INVENTORS
HAROLD C. ZWENG
ARTHUR VASSILIADAS
NORMAN A. PEPPERS
LLOYD E. ALTERTON

BY Flehr, Hohbach, Test,
Albritton & Herbert
ATTORNEYS

PATENTED NOV 21 1972 3,703,176

INVENTORS
HAROLD C. ZWENG
ARTHUR VASSILIADIS
NORMAN A. PEPPERS
LLOYD E. ALTERTON
BY Flehr, Hohbach, Test,
Albritton & Herbert
ATTORNEYS

SLIT LAMP PHOTOCOAGULATOR

The invention described herein was made in the course of work under a grant or award from the Department of Health, Education, and Welfare.

BACKGROUND OF THE INVENTION

This invention pertains to photocoagulation apparatus and more specifically relates to improved photocoagulation apparatus for treating disorders of the human eye.

Pioneering work in the early 1950's led to the first use of photocoagulation in the treatment of certain problems of the eye. Instruments using incoherent light, primarily xenon-arc discharges, were developed and have been used with some success. The development of the laser in 1960 made it possible to consider laser light sources instead of incoherent sources. The laser offered the advantages of higher power, smaller focused spot size and better absorption in the eye. One use of laser photocoagulation is in treating retinal detachments in the human eye by fusing the retina of the eye to the cohoroid. Laser photocoagulation is also used to destroy tumors, to prevent the spread of disease and in many other ways known to the medical profession.

Since photocoagulation destroys the eye tissue in the area being coagulated an effective coagulation apparatus must focus the intense energy only upon a carefully sized and selected portion of the eye which is to be treated. Further, the eye tends to rapidly dissipate the energy which is applied thereto. Therefore the beam of radiant energy used in photocoagulation must be very intense and must be focused with high efficiency in order to achieve the desired coagulation in a very brief period of time before other parts of the eye become over-heated by the radiant energy.

Various photocoagulators have been in use for some years. However, the photocoagulators have had some shortcomings. These include the limitations that the area of the retina that can be treated is restricted to the posterior pole and the near periphery of the eye, and the retina is either totally obscured or poorly seen during the exposure. Further, existing photocoagulators frequently have insufficient magnification, their view is usually monocular, the illumination light for visualization is limited, provisions for aiming the laser beam are less than satisfactory, and the focus of the laser beam is not accurately maintained and may be restricted to large spot sizes.

SUMMARY OF THE INVENTION

Accordingly, it is an object of this invention to provide improved photocoagulation apparatus for use in treating disorders of the eye.

It is another object of this invention to provide photocoagulation apparatus for treating disorders of the eye in which a slit lamp is combined with a laser photocoagulator.

It is another object of this invention to provide a slit lamp photocoagulator which is adapted for treating the exterior parts of the eye as well as the whole retina from the posterior pole to the extreme periphery.

It is another object of this invention to provide a slit lamp photocoagulator in which viewing of the eye is done under high magnification and illumination and in which the view is binocular.

It is another object of this invention to provide a slit lamp photocoagulator in which the focus of a laser beam is accurately maintained, the aiming of the beam is extremely accurate, and in which the beam can be manipulated independently of the viewing optics.

It is another object of this invention to provide a slit lamp photocoagulator in which the size of the laser beam at the focus can be adjusted accurately down to very small spot sizes and in which the power level and exposure time of the beam can be accurately varied.

It is another object of this invention to provide a slit lamp photocoagulator in which the retina of the eye can be seen during the exposure with very minor color balance loss.

In accordance with one embodiment of the invention a slit lamp is coupled to a laser through an articulated arm. The laser beam is always in focus at the focus of the slit lamp viewing optics, and means are provided to manipulate the laser beam independently of the viewing optics. Means are also provided to accurately aim the laser beam and to vary the spot size of the laser beam at the focus as well as the power level of the beam.

Additional objects and features of the invention will appear from the following description in which the preferred embodiments of the invention have been set forth in detail in conjunction with the drawings.

DESCRIPTION OF THE PREFERRED EMBODIMENTS

Figure 1:
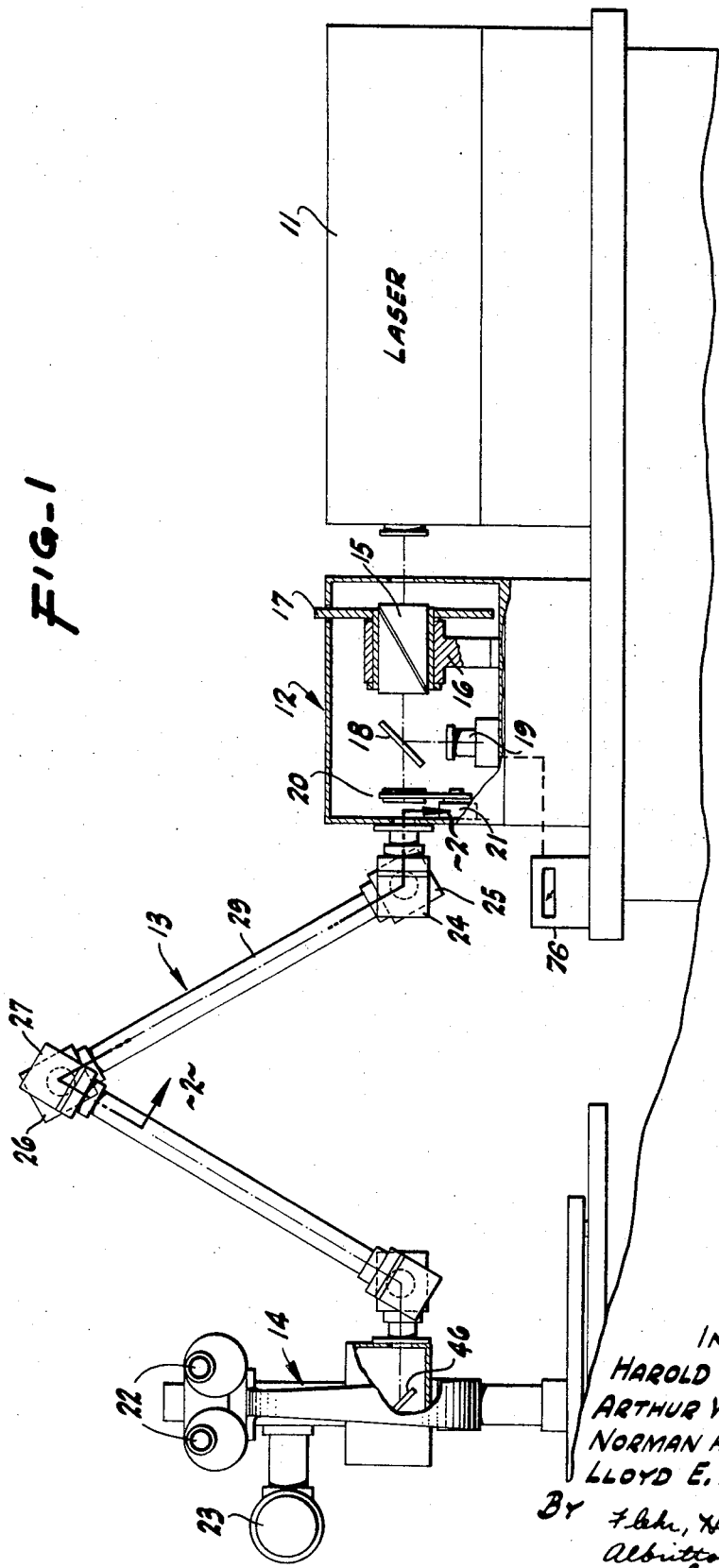
FIG. 1 is an overall view of the slit lamp photocoagulator illustrating the manner in which the laser is coupled to a slit lamp.

Turning now to FIG. 1, there is shown an overall view of the slit lamp photocoagulator. A laser 11 is provided which in one embodiment is a continuous wave argon laser, although other continuous wave lasers could be substituted in this invention. The argon laser, however, does have certain advantages. The high absorption of the argon laser blue-green wave length by the hemoglobin in the eye makes it possible to treat vascular diseases of the eye effectively. Also, the high absorbtion of the argon laser wavelength by the pigments in the eye and the high transmission by the ocular media make it possible to treat diseases with less power than that required by xenon-arc photocoagulators. The high spatial mode purity of the argon laser provides the freedom to operate with focused spot sizes down to less than 50 microns, and the high stability of the argon laser makes possible very accurate control of the dosage in each exposure. Further, as would be true with any continuous laser, the continuous wave nature of the argon laser allows exposures to made that do not cause shock waves usually associated with pulsed ruby photocoagulators. A suitable argon laser is that manufactured by Coherent Radiation Laboratories and designated by them as their model 52 Argon Laser.

The output of the laser 11 is coupled into a control box 12. The control box 12 is connected by an articulated arm 13 to a slit lamp 14 and serves to couple the output of laser 11 into the slit lamp 14.

Light from the laser 11 enters the control box 12 and passes through a Glan-Thompson prism 15 which can be adjusted to vary the quantity of light transmitted therethrough. This serves as a very efficient means of adjusting the power of the laser beam coupled into the slit lamp 14. The Glan-Thompson prism is adjusted by rotating it and to this end it is mounted in a support 16 and has a control extending outside of the control box 12, such as a thumbwheel 17 for adjustment. The laser beam which does pass through the Glan-Thompson prism 15 is intercepted by a beam splitter 18 which is disposed at 45° with respect to the axis of the laser beam. Most of the laser beam is transmitted through the beam splitter 18 but small portion is deflected downward and is incident on a photodiode 19. The photodiode 19 can be connected for example to a voltmeter 76 and the reading of the voltmeter is a very accurate indication of the power of the laser beam which is transmitted through the Glan-Thompson prism.

The laser beam which is transmitted through the beam splitter 19 proceeds to a shutter 20 which is adapted to be moved into and out of the path of the laser beam by a rotary solenoid 21. The shutter 20 may comprise a glass disc having two high reflection dielectric coatings thereon or a coating and a fine mesh screen, for example. Suitable shutters and methods of preparing them are well known to those skilled in the art. The purpose of this shutter 20 is to permit a very small fraction of the laser beam to be transmitted therethrough while the shutter is in the path of the laser beam. This small fraction of the laser beam acts as an accurate aming beam in the instrument since it proceeds along the same path that the full beam will follow when the solenoid 21 is actuated and the shutter 20 is rotated out of the path of the laser beam. Thus the laser beam acts as its own aiming beam and the aiming beam can be seen impinging on the target site, say on the retina, for example. The ophthalmologist thus can see exactly where the photocoagulation will take place. This is a significant feature since the aiming beam is of the same wavelength and same size as the actual photocoagulation beam. A timer may be connected to the solenoid 21 so that the shutter 21 will be actuated for pre-set length of time. Alternatively, the solenoid 21 may be controlled, for example, by a simple switch, so that an operator can have the shutter 20 respond and stay open as long as he maintains a switch closed. This permits operations lasting many seconds to be performed, as desired in the treatment of certain eye-disorders.

The laser beam is brought to the slit lamp 14 by the articulating arm 13, which is discussed in more details hereinafter. The laser beam in this manner is introduced into the optics of the slit lamp 14 in an accurately maintained directional position independent of slit lamp orientation. The slit lamp 14 is a standard type of slit lamp such as, for example, that manufactured by Carl Zeiss, Inc. in West Germany. The slit lamp 14 comprises a binocular optical viewing arrangement, generally indicated by reference numeral 22 and a light source 23 for illuminating the eye under observation. The modifications to the slit lamp 14 for coupling the laser beam into the patient's eye will be discussed in detail hereinafter.

Figure 2:
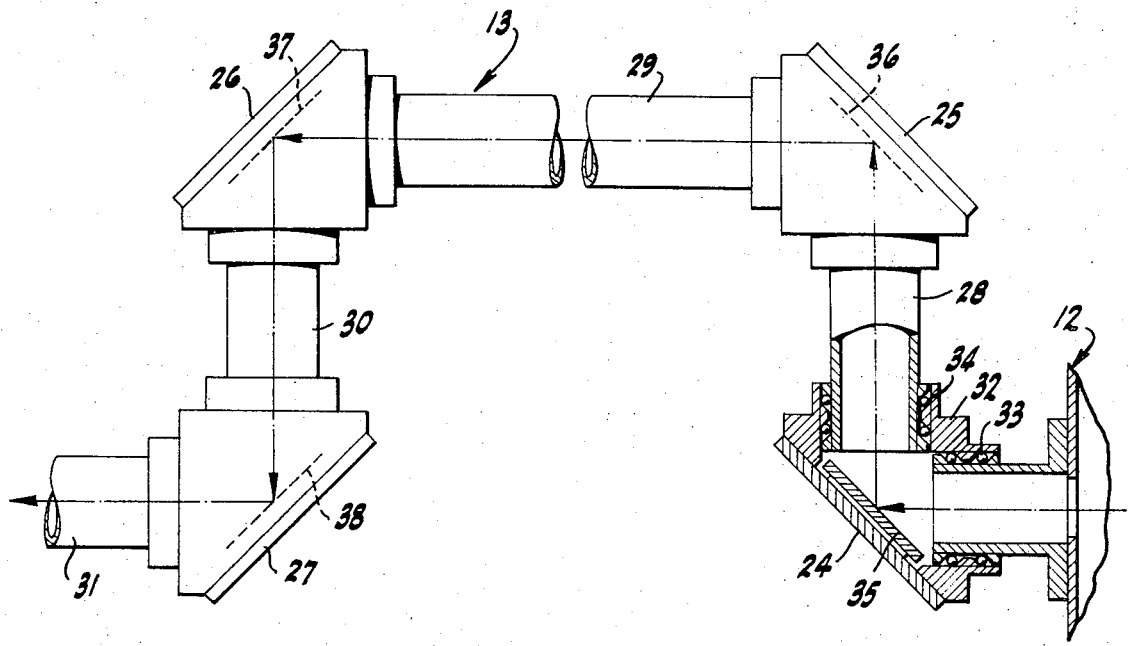
FIG. 2 is a sectional view of the articulated arm in FIG. 1 taken along the line 2 — 2.

Referring now to FIG. 2 there is shown a sectional view of a portion of the articulated arm 13 taken along the line 2 — 2 in FIG. 1. The articulated arm 13 comprises six precision bearing joints, four of which are shown in FIG. 2 and are designated by reference numerals 24, 25, 26 and 27. The bearing joints are spaced by straight hollow tubes such as tubes 28, 29, 30 and 31. Each of the precision bearing joints is identical; consequently only one will be described. The precision bearing joint 24 comprises a housing 32 which carries two bearing assemblies 33 and 34. A reflecting surface 35 which may, for example, be a mirror or a prism, is mounted to the housing 34. The bearing assemblies, such as bearings 33 and 34, allow rotation of each of the joints about the hollow tubes, such as tube 28, which connect the precision bearing joints. In this manner optical alignment is maintained between each of the reflecting surfaces such as mirrors 35, 36, 37 and 38, regardless of the positional orientation of the precision bearing joints or hollow tubes. The laser beam is thus introduced into the slit lamp in an accurately maintained direction and position independent of the orientation of the slit lamp.

Figure 3:
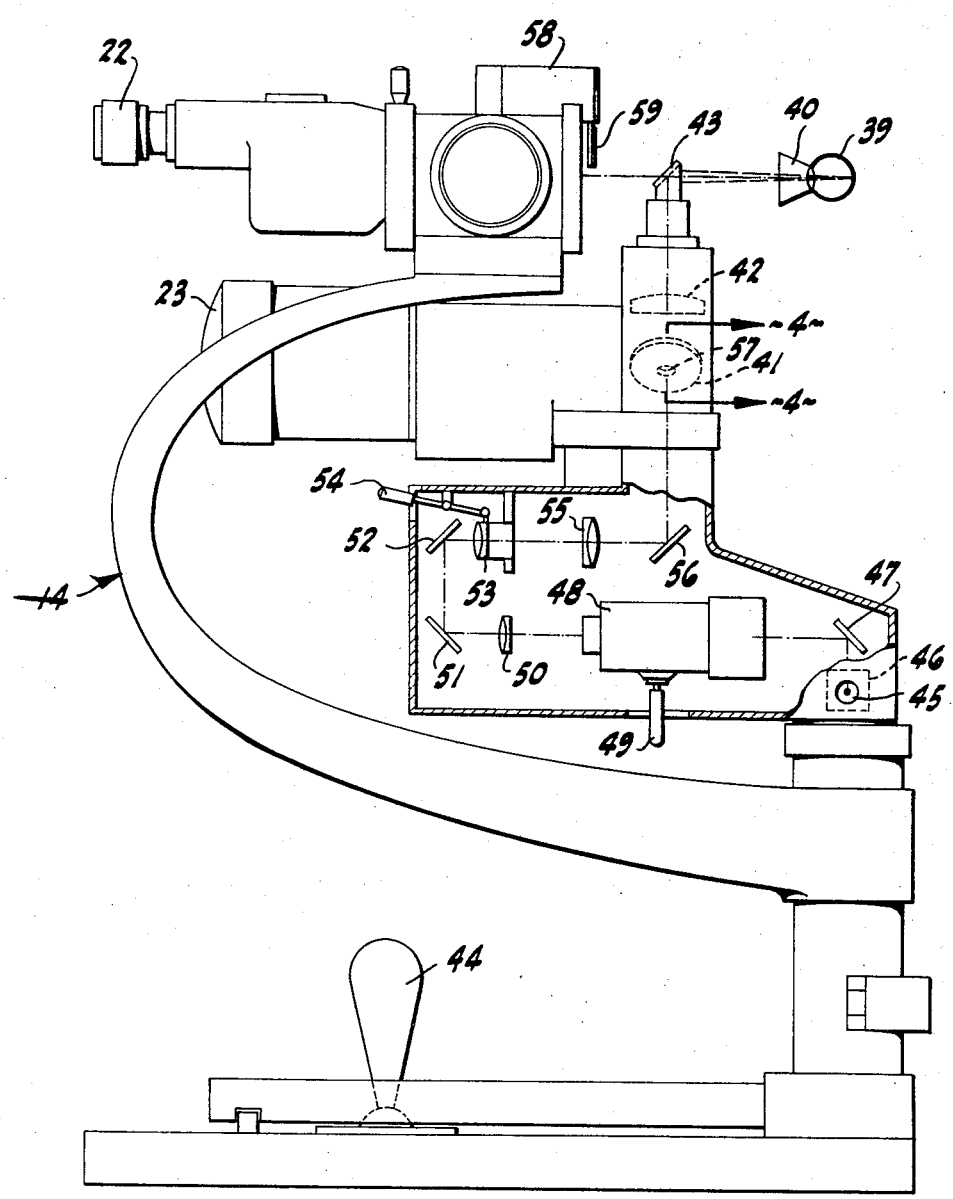
FIG. 3 is a side elevation partially broken away of the slit lamp of FIG. 1.

Referring now to FIG. 3, there is shown a side-view partially broken away of the slit lamp 14, illustrating the optics contained therein. The slit lamp 14 is a standard slit lamp such as that manufactured by Carl Zeiss, Inc. of West Germany with certain modifications thereto. The standard slit lamp 14 includes a binocular viewing arrangement 22 which permits magnified viewing of portions of a patient's eye indicated by reference number 39. The patient's eye 39 is shown as having a Goldman corneal contact lens 40 applied thereto. The Goldman lens 40 is well known to ophthalmologists and permits the viewing, and consequently the treating in accordance to the principles of this invention of any part of the retina of the eye, from the posterior pole to the extreme periphery. Also a part of the standard slit lamp is a light source 23 which supplies light to a mirror 41 which reflects the light upward through a lens 42 to a prism 43. The prism 43 reflects the illuminating light through the Goldman lens 40 into the patient's eye 39. A standard slit lamp also includes a positional control lever 44 which may be used to adjust the orientation of the slit lamp.

The laser beam is coupled into the slit lamp from the articulated arm through an opening 45. Mirrors 46 and 47 reflect the laser beam to a zoom lens 48. The zoom lens 48 functions to control the spot size of the laser beam on the eye by adjustment of the lever 49 and is discussed in more detail hereinafter. The zoom lens 48 in combination with the lens 50 act as a telescope and adjust the laser beam to the proper diameter; the laser beam thus exits lens 50 in a parallel fashion. Mirrors 51 and 52 serve to deflect the beam to lens 53 which is mounted such that it can be translated in any lateral direction by the use of a manipulator 54 in order to permit the laser beam to be freely moved around at its focus, on the retina of an eye for example. This permits accurate positioning of the laser beam independently of the binocular viewing optics 22 of the slit lamp.

Figure 4:
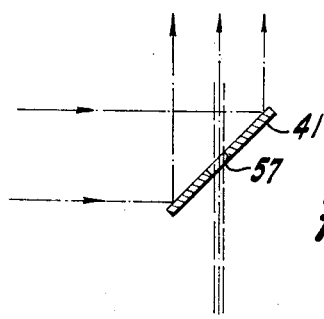
FIG. 4 is a cross sectional view of a mirror in the structure of FIG. 3 taken along the line 4 — 4.

The laser beam then passes through a lens 55 and is deflected by a mirror 56 through a small hole 57 in the mirror 41. The laser beam is then coaxial with the slit lamp illuminating light as may be more clearly seen in FIG. 4 which is a section through mirror 41 taken along the line 4 — 4.

Still referring to FIG. 3, the laser beam and illuminating light proceed from mirror 41 through an adjustable lens 42 and are reflected by prism 43 into the Goldman corneal contact lens 40 and eye 39. The adjustable lens 42 is a standard element of the slit lamp and serves to focus the illuminating light of the slit lamp upon the portion of the eye under consideration. In accordance with the principles of this invention the laser beam is coaxial with the illuminating light and is also focused by the adjustable lens 42. In this way the laser beam is always focused at the same portion of the eye that is being viewed through the slit lamp, thus eliminating any separate laser beam focusing operations.

Figure 5:
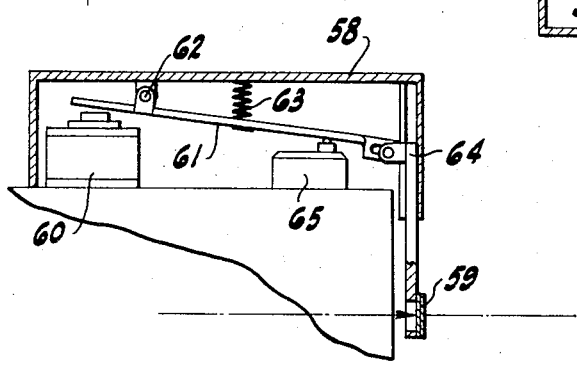
FIG. 5 is a side elevation partially broken away of the solenoid actuated filter in the slit lamp of FIG. 3.

The view of the ophthalmologist is protected during exposure by a solenoid activated device 58 that brings a protective filter 59 in the viewing path. Referring now to FIG. 5, there is shown a detailed view of the solenoid activated device 58. A solenoid 60 is activated to pivot a lever arm 61 about a pivot point 62. This overcomes the restraining force of a spring 63 and displaces a holder 64 which carries the filter 59. The filter 59 is thus placed in the viewing path and functions to absorb most of the blue-green light of the bright laser during the exposure, but offers little degradation of the view of the operation during exposure. Suitable filters are well known in the art. A microswitch 65 is positioned to be actuated by the lever arm 61 when filter 59 is moved into position and can function as a interlock. That is, the microswitch 65 must be actuated in order to actuate the shutter which blocks most of the laser beam. At the end of the exposure, the duration of which may be controlled by a timer in the power circuit for solenoid 60, power is removed from the solenoid 60 and the action of spring 63 withdraws the filter 59 from the viewing path.

Figure 6:
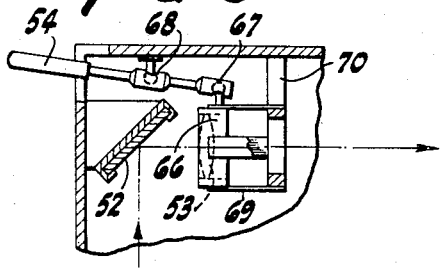
FIG. 6 is an enlarged view of a portion of the slit lamp of FIG. 3 showing the laterally movable lens and its manipulator.

Referring now to FIG. 6, there is shown a detail view of the lens 53 illustrating the manner in which it may be laterally displaced by manipulator 54. The lens 53 is carried in a holder 66 which is connected through a ball joint 67 to manipulator 54, which itself is mounted by a ball joint 68. The holder 66 is attached by four flexible strips 69, which may be thin metal strips for example, to a rigid support 70. Moving the manipulator 54 causes the holder 66 and lens 53 to be laterally displaced against the spring action of the flexible strips 69. When the manipulator is released, the flexible strips 69 return the holder 66 and lens 53 to their original position. This arrangement allows the laser beam to be freely laterally displaced at the point where it is focused on the eye, independently of any adjustment or displacement of the viewing optics.

The zoom lens 48 illustrated in FIG. 3 is a type of lens well known in the art and has the property that its effective focal length can be changed over a substantial range (in this case a 5:1 ratio) by means of the lever 49, while at the same time its focal plane (the plane in which rays of light are brought to focus) remains fixed. Functionally, zoom lens 48 in combination with lens 50 constitutes a variable magnification telescope which receives nearly collimated light and transmits nearly collimated light. By changing the position of the lever 49 on zoom lens 48 it is possible to change the angular divergence (over a ratio of 5:1 in this case) of the bundle of light rays which is transmitted by the combination of lens 48 and 50. Since the size of the spot of the laser beam focused on the eye is determined by this angular divergence, moving lever 49 on zoom lens 48 has the effect of changing the size of the laser beam spot (in this case over a range of 5:1) on the eye while always maintaining the bundle of light rays in focus on the eye.

Figure 7:
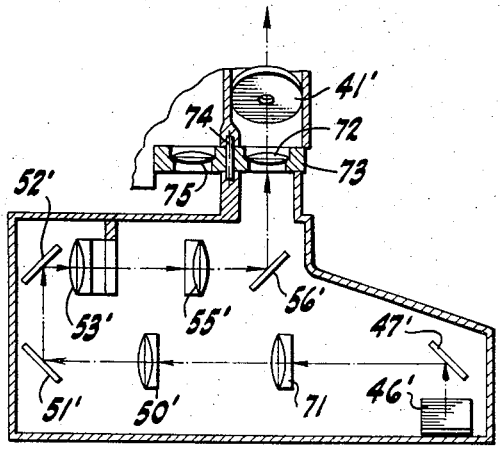
FIG. 7 is an illustration of an alternate embodiment of a slit lamp in accordance with the principles of this invention with a lens wheel for varying the spot size of the laser beam.

Referring now to FIG. 7, there is shown another embodiment of this invention in which specially designed lenses rather than a zoom lens are used to obtain variation of spot size of the laser beam. FIG. 7 illustrates the laser optics portion of the slit lamp and elements common to both the embodiments of FIG. 3 and FIG. 7 are given like reference numerals, but with primes in FIG. 7. The laser beam is deflected by mirror 47' through a lens 71 which takes the place of the zoom lens in FIG. 3 and through a lens 50'. The lenses 71 and 50' act as a telescope and adjust the laser beam to the proper diameter with all the light rays in the laser beam parallel. The laser beam is then deflected by mirrors 51' and 52' through lens 53' which may be laterally movable as in the embodiment of FIG. 3. The laser beam then passes through a lens 55' and is deflected upward by mirror 56' through a lens 72 to the mirror 41'. The lens 72 is one of a plurality of lenses carried by a lens wheel 73. The lens wheel 73 may contain any number of additional lenses 75, say five for example, and is mounted for rotation about an axis 74. In this manner any of the lenses carried by lens wheel 73 may be moved into the path of the laser beam.

Each lens in lens wheel 73 is specially designed and provides a specific size of beam focus at the same fixed position in space that is coincident with the focal plane of the binocular viewing optics of the slit lamp. In this way different size exposure sites can be obtained at the target site always coincident in space with the view of the ophthalmologist or operator. That is, the size of the exposure at the target can be varied without changing the focus.

Each of the individual lens in lens wheel 73 is designed such that for an incident collimated beam of certain cross section, a specific image size is formed at the focus. This is not a design of a diffraction limited lens, but rather a design such that the lens has specific aberrations which cause the beam to focus to a specific size, appreciably higher than the diffraction limited spot, at the focus. The determination of the specific aberrations required are easily found from modern optics theory as is well known to those skilled in the optics art. Through the use of these special lenses the laser beam is always coincident with the focused view of the ophthalmologist and yet different focused beam spot sizes are obtained.

In operation, the ophthalmologist adjusts the Glan-Thompson prism 15 to pass the proper power or portion of the laser beam which it is desired to apply. A timer in the control circuiting may also be adjusted to provide a controlled exposure time. The desired laser beam spot size is set by adjustment of zoom lens 48 or selection of the proper specially-designed lens. The ophthalmologist or other operator then focuses by means of adjusting control lever 44 so that he can focus on the part of the eye to be treated. As discussed before, the laser beam is also simultaneously focused since the laser beam and the viewing optics are parfocal. The small portion of the laser beam which is passed through shutter 20 acts as an aiming beam and can be seen through the viewing optics of the slit lamp. If necessary, the ophthalmologist can move the laser beam around until it impinges at the proper position through use of the manipulator 54.

After the laser beam is properly positioned, exposure is initiated. The protective filter drops into position in the viewing optics and the shutter 20 is rotated out of the path of the laser beam. The laser beam is thus applied to the selected portion of the eye for as long as desired.

I claim:

1. Photocoagulation apparatus for treating a patient's eye comprising viewing optics adapted to be positioned adjacent the patient's eye, means for providing a photocoagulation treatment beam, optical means for coaxially coupling said viewing optics and said means for providing a photocoagulation treatment beam into the patient's eye whereby the beam can be focused on a particular portion of the patient's eye, said optical means including means for adjusting the focus of said viewing optics to that particular portion, said optical system including lateral adjustment means for laterally displacing said beam with respect to the patient's eye independent of said viewing optics.

2. Photocoagulation apparatus in accordance with claim 1 wherein said viewing optics comprises a slit lamp.

3. Photocoagulation apparatus in accordance with claim 1 wherein said lateral adjustment means comprises a manually movable lens disposed in the path of said beam.

4. Photocoagulation apparatus in accordance with claim 1 including shutter beams movable into and out of the path of said beam to block all but an aiming beam portion of said beam.

5. Photocoagulation apparatus in accordance with claim 1 wherein said photocoagulation treatment beam means comprises a laser.

6. Photocoagulation apparatus for treating a patient's eye, comprising a slit lamp adapted to be positioned adjacent the patient's eye, a continuous wave laser for generating a beam, means for coupling said laser beam to said slit lamp comprising a control box and an articulated arm which extends between said control box and said slit lamp, said control box including adjustable optical means disposed in the path of said laser beam and adjustable to vary the portion of said laser beam transmitted therethrough and including a photodiode, means to deflect a predetermined portion of said laser beam to said photodiode, and means connected to said photodiode for indicating the power of said laser beam.

7. The apparatus of claim 6 including shutter movable into and out of the path of said laser beam and adapted to block all but a small portion of said laser beam when in the path thereof, said shutter means comprising a dielectric coated glass vane and a solenoid for moving said vane.

8. The apparatus of claim 6 including a movable lens disposed in the path of said laser beam for laterally displacing the focus of said laser beam independently of said slit lamp.

* * * * *